US012091899B2

(12) United States Patent
Sturm

(10) Patent No.: US 12,091,899 B2
(45) Date of Patent: Sep. 17, 2024

(54) INCLINATION DEPENDENT OPENING DEVICE FOR A MOTOR VEHICLE DOOR ELEMENT

(71) Applicant: Kiekert AG, Heiligenhaus (DE)

(72) Inventor: Christian Sturm, Krefeld (DE)

(73) Assignee: Kiekert AG, Heiligenhaus (DE)

( * ) Notice: Subject to any disclaimer, the term of this patent is extended or adjusted under 35 U.S.C. 154(b) by 290 days.

(21) Appl. No.: 17/625,486

(22) PCT Filed: Jun. 30, 2020

(86) PCT No.: PCT/DE2020/100570
§ 371 (c)(1),
(2) Date: Jan. 7, 2022

(87) PCT Pub. No.: WO2021/013294
PCT Pub. Date: Jan. 28, 2021

(65) Prior Publication Data

US 2022/0268080 A1 Aug. 25, 2022

(30) Foreign Application Priority Data

Jul. 23, 2019 (DE) ..................... 10 2019 119 823.2

(51) Int. Cl.
*E05B 81/64* (2014.01)
*E05B 81/20* (2014.01)
(Continued)

(52) U.S. Cl.
CPC .............. *E05F 15/70* (2015.01); *E05F 15/60* (2015.01); *E05Y 2201/434* (2013.01);
(Continued)

(58) Field of Classification Search
CPC ........... E05F 15/70; E05F 15/60; E05F 15/73; E05F 15/611; E05Y 2201/434;
(Continued)

(56) References Cited

U.S. PATENT DOCUMENTS

2007/0107313 A1 5/2007 Suzuki et al.
2016/0369551 A1* 12/2016 Suzuki .................... E05C 17/00
(Continued)

FOREIGN PATENT DOCUMENTS

CN 105358785 A 2/2016
DE 102006038447 A1 * 2/2008 ............. E05F 15/40
(Continued)

OTHER PUBLICATIONS

First Office Action dated Feb. 1, 2023, for corresponding Chinese Patent Application No. 202080052265.X.
International Search Report mailed Oct. 15, 2020, for priority International Patent Application No. PCT/DE2020/100570.

*Primary Examiner* — Jelani A Smith
*Assistant Examiner* — George A Alcorn, III
(74) *Attorney, Agent, or Firm* — Renner, Otto, Boisselle & Sklar, LLP

(57) ABSTRACT

A method for controlling an opening device and to an opening device for a motor vehicle door element, having a control unit, an electric drive, and an actuating element, wherein the actuating element can be actuated by means of the drive, and the door element can be opened by means of the actuating element. The opening device can be controlled on the basis of a position, in particular the inclination of the motor vehicle.

12 Claims, 1 Drawing Sheet

(51) Int. Cl.

| | |
|---|---|
| ***E05B 81/70*** | (2014.01) |
| ***E05F 15/60*** | (2015.01) |
| ***E05F 15/611*** | (2015.01) |
| ***E05F 15/70*** | (2015.01) |
| ***E05F 15/73*** | (2015.01) |

(52) U.S. Cl.
CPC ....... *E05Y 2400/40* (2013.01); *E05Y 2400/44* (2013.01); *E05Y 2400/52* (2013.01); *E05Y 2900/531* (2013.01)

(58) Field of Classification Search
CPC ............. E05Y 2400/40; E05Y 2400/44; E05Y 2400/52; E05Y 2900/531; E05Y 2201/426; E05B 81/64; E05B 81/20; E05B 81/70; E05C 17/003
USPC ............................................................ 701/49
See application file for complete search history.

(56) References Cited

U.S. PATENT DOCUMENTS

| | | | | |
|---|---|---|---|---|
| 2017/0159347 | A1 * | 6/2017 | Mayr | B60P 1/4414 |
| 2019/0301226 | A1 * | 10/2019 | Kaburaki | E05D 3/127 |

FOREIGN PATENT DOCUMENTS

| | | | | | |
|---|---|---|---|---|---|
| DE | 102010023398 | A1 | | 12/2011 | |
| DE | 102011015669 | A1 | | 10/2012 | |
| DE | 102014216759 | A1 | | 2/2016 | |
| DE | 102016105760 | A1 | | 10/2017 | |
| DE | 102016207961 | A1 | * | 11/2017 | E05F 15/611 |
| DE | 102017207556 | A1 | * | 11/2018 | E05C 17/003 |
| DE | 102017124282 | A1 | | 4/2019 | |
| FR | 2860823 | A1 | * | 4/2005 | B60Q 1/2669 |
| GB | 2551210 | A | * | 12/2017 | E05F 15/611 |
| JP | 2010077714 | A | * | 4/2010 | |
| WO | 2005008007 | A1 | | 1/2005 | |

* cited by examiner

INCLINATION DEPENDENT OPENING DEVICE FOR A MOTOR VEHICLE DOOR ELEMENT

This application is a national phase of International Application No. PCT/DE2020/100570 filed Jun. 30, 2020, which claims priority to German Patent Application No. 10 2019 119 823.2 filed Jul. 23, 2019, the entire disclosures of which are hereby incorporated by reference.

FIELD OF DISCLOSURE

The invention relates to an opening device for a motor vehicle door element, having a control unit, an electric drive and an actuating element, it being possible for the actuating element to be actuated by means of the drive and for the door element to be opened by means of the actuating element.

BACKGROUND OF DISCLOSURE

Today's motor vehicles are increasingly being provided with convenience functions. For example, in order to make it easier to get into a motor vehicle and to be able to influence the aesthetic and aerodynamic shape, motor vehicles are equipped, for example, without an outer door handle. It is also conceivable, however, that an outside door handle is provided, but this only forwards a switching signal to the motor vehicle to open it. In order to facilitate and automate getting into vehicles and, for example, to allow for getting into vehicles without handles on the outside of the door, so-called opening devices or door openers, some of which are also referred to as door positioners, are used.

A door opener for motor vehicle doors or panels, by means of which a door, panel or hood can be moved from a closed position into an open position, is known from DE 10 2011 015 669 A1. If the positioning apparatus relates, for example, to a motor vehicle side door, the door can be opened by means of an electrical pulse. For this, the locking mechanism of the door latch must first be unlocked, preferably electrically, so that the door can be opened. If, for example, the door sealing pressure is not sufficient to move the door from the closed position into an open position, the door can be moved into an open position by means of the positioning apparatus. An open position is defined here in such a way that the operator of the motor vehicle is able to grasp the door so that they can fully open the door. An electric drive is used as the positioning apparatus, which drive acts mechanically on the motor vehicle door in the form of a pivoting movement of the levers via a drive pawl and an inner and outer lever.

DE 10 2016 105 760 A1 discloses an opening device for a motor vehicle door having a base plate, and further having a drive element mounted on the base plate and a drive unit, wherein a first sensor assigned to the drive element is provided which distinguishes at least between an opening process and a manual opening process. The opening device comprises a drive which can be driven via a sensor and a control unit. A flexible connecting means then allows for a transmission lever to be pivoted, which in turn allows for an opening movement via a drive lever and a drive slide. In order to allow for the door to be moved, the drive slide moves linearly and, for example, out of an opening in a body so that an unlatched and unlocked door can be opened at least in some regions. The end position of the drive slide can be detected by means of a second stationary sensor so that the drive can be switched off again.

DE 10 2017 124 282 A1 discloses an opening device for a motor vehicle door element comprising an electric drive and an actuating means, wherein the actuating means can be adjusted by means of the drive and a gear mechanism arranged between the actuating means and the drive. The door can be moved by means of the opening device, wherein a sliding element is arranged on the actuating element and interacts with a switching means so that the door movement can be detected. The actuating means is substantially formed from a driven toothed rack having an integrated sliding element, switching means and electrical supply line. It is possible to control the movement of the driven toothed rack by means of the switching means between the sliding element and the body.

In order to make holding an opened door possible, DE 10 2018 132 665.3 discloses an opening device in which the door element can be held by means of an actuating means. The door element can then be released by the actuating means on the basis of an operation force on the door element. The force applied to the door element is detected in the gear stage, a gear stage being pivotally mounted, for example by means of a leaf spring. The devices known from the prior art for opening a motor vehicle door after a motor vehicle lock has been unlocked allow the door to be opened at least in some regions and to be held in the open position so that an operator of the motor vehicle is able to grasp the door through a gap and open it completely. The known opening devices have in principle proven their worth but reach their limits when the electrically operated doors are opened electrically on a sloping street for example. This is the starting point for the invention.

SUMMARY OF DISCLOSURE

The object of the invention is that of providing an improved opening device for a motor vehicle door element. In addition, the object of the invention is that of providing an opening device which allows for the highest level of safety for vehicles parked on sloping roads. Finally, the object of the invention is that of providing a structurally simple and inexpensive solution.

The object is achieved by the features of independent claim 1. Advantageous embodiments of the invention are specified in the dependent claims. It should be noted that the exemplary embodiments described below are not restrictive; rather, any variation possibilities of the features described in the description and the dependent claims are possible.

According to claim 1, the object of the invention is achieved in that an opening device for a motor vehicle door element is provided, the device having a control unit, an electric drive and an actuating element, it being possible for the actuating element to be actuated by means of the drive and for the door element to be opened by means of the actuating element, and wherein the opening device can be controlled on the basis of a position, in particular an inclination of the motor vehicle. The structure of the opening device according to the invention now makes it possible to provide an opening device which takes into account the position or the inclination of the motor vehicle when controlling the opening device. In particular, the inclination of the vehicle is taken into account when controlling the opening device to the effect that the opening device can be controlled on the basis of an inclination of the vehicle. The control unit is used to evaluate or forward the signal generated by the vehicle user in order to actuate and activate the opening device. If the motor vehicle is in a position or inclination in which opening the door element is significantly influenced by additional forces from the force of gravity, i.e., the vehicle is inclined in such a way that, in addition to the pure opening forces, additional forces act on the door element which additionally accelerate the door element after the latch has been unlocked, the control unit is able to take this into account when activating the opening device. In other words, if the motor vehicle is, for example, in a position in which the door element is strongly accelerated by the force of gravity as soon as the motor vehicle latch is unlocked, the control unit is able to take these additional forces on the door element into account. By means of the opening device according to the invention, it is thus possible to control the opening device on the basis of the inclination of the motor vehicle, in particular it is possible to prevent an opening process in order to prevent an unhindered, i.e., uncontrolled, movement of the door element.

This applies in particular and in an advantageous manner to opening devices which are designed in such a way that they only allow the door to be opened without a locking mechanism to allow the door element to be held in the open position. If the door element is activated in a flange position by means of the opening device, and if the door element is additionally accelerated by gravity, the door element can be pivoted beyond the actual open position and into a position in which the door element hits an obstacle or itself becomes an obstacle for other road users. A high level of safety can thus be ensured by the integration according to the invention of the detection of a position of the vehicle and the control unit preventing opening.

The opening device is used in a motor vehicle door element. The motor vehicle door element can also be, for example, a panel, hood or cover, for example for a convertible roof. In an advantageous manner, the opening device cooperates with an electrically operable closing system so that a high degree of constructive freedom can be made possible in the design of the door element. For example, the door element can dispense with a door handle, which results in almost any form of an outer shape of the door element.

The opening device is arranged in the region of the door element in such a way that the door element can be positioned by operating the opening device. The opening device generates a relative movement between the body and the door element, the opening device preferably being arranged in the door element itself. An arrangement in the body for moving the door element is of course also conceivable. It is also conceivable that the opening device is integrated into the motor vehicle latch, for example of a side door. This offers the advantage that an electrical voltage is available for the drive and/or that further functions in the motor vehicle latch can be operated by the drive.

The electric drive preferably consists of a direct current motor which interacts with an output shaft, for example with the actuating element via a worm gear. One-stage, two-stage or multi-stage gear mechanisms are conceivable, wherein the selection of the gear mechanism can influence the force available on the actuating means. If, for example, the opening device is arranged in the door element in such a way that the opening device interacts, for example, with an A-pillar of the motor vehicle and a front door, higher forces are required to open the door element than if the opening device is in turn arranged in a front door of a motor vehicle and acts on a B-pillar in the motor vehicle. If a door is opened and the opening device is arranged in the region of the motor vehicle latch, lower forces are required so that favorable ratios can be used for quick opening.

The electric drive unit allows the actuating means to move. By means of the electric motor it is possible to move the actuating means in such a way that the door can be opened by the driven actuating means. The actuating means moves relative to the body and exerts a compressive force on the vehicle door element so that the unlatched and unlocked door can be moved.

The opening device preferably interacts with a motor vehicle latch which has a catch and at least one receiving box, wherein the locking mechanism consisting of the catch and at least one pawl can be unlocked electrically. In particular in the case of electrically unlockable closing systems, the operator of the motor vehicle only needs an electrical pulse to move the closing system into an unlocked, i.e., open, position. The closing system is then open so that the door or panel can be moved. The electrical opening pulse for the motor vehicle latch can be generated by means of a sensor, a key, which can also be referred to as a key fob, or, for example, a sensitive means, such as a touch sensor or an outer door handle with an integrated sensor.

Once the vehicle door element is unlocked, the door element can be freely pivoted in the hinges. The door may also have a door retaining strap which can hold the door in a plurality of open positions. The door, once unlocked, can then be moved by means of the opening device.

The control unit is part of the motor vehicle and is used, for example, to detect the operator's signal that the door or the door element is to be opened. The signal is detected by the control unit and converted into a signal for unlocking the motor vehicle latch assigned to the door element. The control unit thus detects the operator request and forwards the operator request to the motor vehicle latch. If the operator's request is detected by means of the control unit and the motor vehicle latch is unlocked, the control unit is at the same time able to activate the opening device. The unlocked door can then be moved or opened by means of the opening device. According to the invention, the control unit also takes into account the position of the motor vehicle and optionally prevents the opening process for the door element from being initiated on the basis of the position of the motor vehicle.

In an alternative embodiment, an inclination sensor is provided, and the sensor data of the inclination sensor can be evaluated by means of the control unit. An inclination sensor integrated in the motor vehicle is able to detect the inclination of the vehicle so that it is possible to detect which additional forces act on the door element when the opening device is operated. The sensor data of the inclination sensor are evaluated and processed in the control unit in such a way that the door element can be prevented from opening on the basis of a limit angle. The control unit is thus able to operate the opening device and the motor vehicle latch on the basis of the sensor data of the inclination sensor and on the basis of an adjustable limit angle. The limit angle or the limit value for the angle from which the control unit does not activate the opening device is adjustable and depends on the weight of the door element, the mobility of the door element in the hinges and/or on the holding force of the door strap or the holding force of the opening device. The dependency on the holding force of the opening device is of course related to the fact that the opening device has a separate locking means so that the door element can be held in the open position. On the basis of the sensor data, the control unit is consequently able to determine whether a limit value for the incline is exceeded so that a remote control option can be deactivated. In this case, the opening device can only be activated by, for example, an outside door handle on the door itself.

This ensures that the operator can manually prevent the door element from swinging open unintentionally.

In an alternative embodiment of the invention, the inclination sensor and/or the control unit are part of the opening device. The opening device can contain, for example, an inclination sensor and thus supply the control unit with a direct signal regarding the parking position or the incline on which the vehicle is parked. Thus, all of the data relevant to using the opening device according to the invention can be provided directly by the opening device itself. According to the invention, however, it is also conceivable that the control unit itself is part of the opening device. In particular, in order to achieve independence from the control unit of the motor vehicle and to be able to provide an autonomous system of an opening device, the inclination sensor and the control unit can be part of the opening device.

If the opening device has a locking means for the door element, this results in a further alternative embodiment of the invention. The door element can be held in the open position by means of a locking means. A locking lever which is arranged on the actuating element and can hold the door element in the open position can be used as the locking means, for example. The holding force is dependent on the weight of the door and the mobility of the door element, but only small forces are required to manually open the door element beyond the open position. If the inclination sensor is used to determine an incline which exceeds the holding force of the locking means, the opening device can in turn be deactivated by means of the control unit. In this case, the door element can only be unlocked and opened manually, i.e., for example, by means of an outside door handle. This provides the highest level of security in order to prevent the door element from being opened completely inadvertently.

In an alternative embodiment, the opening device can be deactivated on the basis of an angle of inclination of the motor vehicle, it being possible for the angle of inclination to be adjusted depending on the structure of the motor vehicle and the mobility of the door element. The angle of inclination may vary with respect to the incline on which the vehicle is parked. In particular, the inclination sensor can detect the incline on which the vehicle is parked and, in particular, the control unit can be used to detect which door is activated by means of the opening device. The driver's door is preferably activated by means of a radio remote control, not only the inclination of the vehicle but also the orientation of the vehicle having an influence on an activation or deactivation of the opening device. The vehicle can be parked in a position that has a steep incline, but if the vehicle is parked in the direction of the slope, i.e., up the slope, the inclination of the vehicle has no influence on the opening device. Rather, the force of gravity counteracts the opening device when the door element is opened. If the vehicle is parked on the slope in such a way that the vehicle is parked in the direction of travel down the slope, gravity acts in the opening direction of the door element so that the door element can be moved beyond the open position by gravity, which leads to collisions and/or traffic obstructions without the operator being able to directly influence the opening of the door element. In this case, the opening device is deactivated by means of the control unit, as a result of which remotely operated opening of the door element is prevented.

In a further alternative embodiment, the opening device has a means for generating acoustic, optical and/or haptic signals. A signal generator can, for example, output an acoustic signal, as a result of which the opening, but also the deactivation, of the opening device can be indicated to the operator. Depending on the embodiment and structure of the opening device, acoustic, optical and/or haptic signals can be actively transmitted to the operator of the motor vehicle, which signals indicate that the opening device has been opened and/or deactivated. Optical means are, for example, lighting means which are arranged on the motor vehicle and/or are arranged as separate elements, for example in the door handle and/or the opening device. Haptic feedback can for example be passed on to the operator of the motor vehicle via the radio remote control itself and/or the door handle.

In terms of method, the object of the invention is achieved in that a method for controlling an opening device of a motor vehicle door element is provided, an actuating element being actuated by means of an electric drive and the drive being activated by means of a control unit, and at least one sensor signal for controlling the drive being evaluated by means of the control unit, wherein the sensor data of an inclination sensor of the motor vehicle are evaluated in order to control the opening device. The method for controlling an opening device according to the invention now allows the possibility of being able to provide safe opening of the door element. In particular, by taking into account the inclination of the vehicle and the position of the door element in relation to the slope or the gradient on which the vehicle is parked, opening by means of the opening device can be prevented, as a result of which dangerous situations and/or damage to the motor vehicle can be prevented. The sensor data of the inclination sensor integrated in the motor vehicle are detected and processed in the control unit in order to control the opening device. If the calculation of the sensor data of the inclination sensor results in values that indicate that the door could move beyond the open position, the control unit can be used to initiate a method step which prevents the door element from being opened automatically.

In an alternative embodiment of the method, a limit value of an angle of inclination is detected by means of the control unit and the opening device is deactivated when the angle of inclination limit value is reached and/or exceeded. Exceeding the limit value, which is detected in the control unit and on the basis of which the limit value for switching off is determined, depends on influencing factors, such as the mobility of the door element and/or the presence of a locking means on the opening device.

It is advantageous if an acoustic, optical and/or haptic signal is passed on to the operator of the motor vehicle when the angle of inclination limit value is reached and/or exceeded. The operator of the motor vehicle thus learns that the motor vehicle is ready for operation, but only manual opening of the door element ensures safe opening of the door element.

The method can advantageously be designed in such a way that the inclination angle of the motor vehicle is detected by means of an inclination sensor integrated in the opening device. The detection of the inclination of the motor vehicle by an integrated inclination sensor, i.e., integrated in the opening device, offers the advantage that an autonomous control method can be provided. In particular, the opening device is able to independently initiate a safety measure, as a result of which obstructions to road traffic and/or damage to the motor vehicle are prevented.

The invention is explained in more detail in the following with reference to the attached drawings on the basis of a preferred exemplary embodiment. However, the principle applies that the exemplary embodiment does not limit the invention, but merely represents one embodiment. The features shown can be implemented individually or in combination with further features of the description as well as the claims, individually or in combination.

In the drawings:

DETAILED DESCRIPTION

Figure 1:
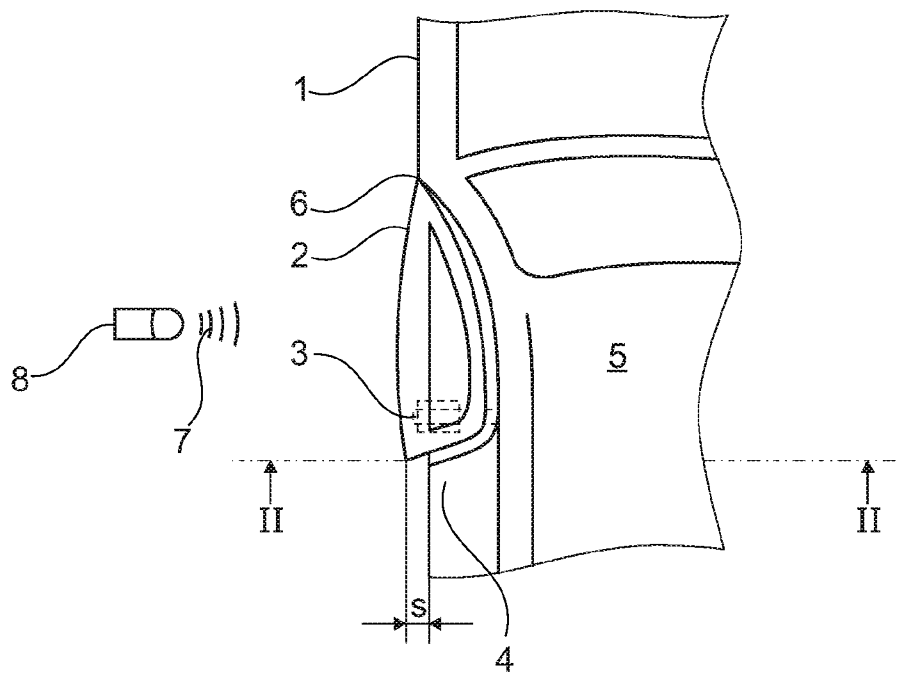
FIG. 1 shows a plan view of a motor vehicle having a side door in an open position and an opening device as an integrated component of the side door.

FIG. 1 shows a plan view of a motor vehicle 1 in the region of a door element 2 in the form of a driver's door 2. The door element 2 is shown in an open position, an opening device 3 having moved the door element 2 into an open position. The door element 2 has been opened by means of the opening device 3 along an actuation path S and, for example, along an actuation path of approximately 4-8 cm, preferably 5-7 cm, and even more preferably by approximately 6.5 cm. In this exemplary embodiment, the opening device 3 is arranged in the door element in such a way that the opening device interacts with a B-pillar of the motor vehicle body 5. The door element 2 itself is pivotally arranged on the A-pillar 6. FIG. 1 thus shows the state after an operator has sent an opening signal 7 to the motor vehicle by means of, for example, a radio remote control 8, as a result of which the door element could be opened by means of the opening device 3.

Figure 2:
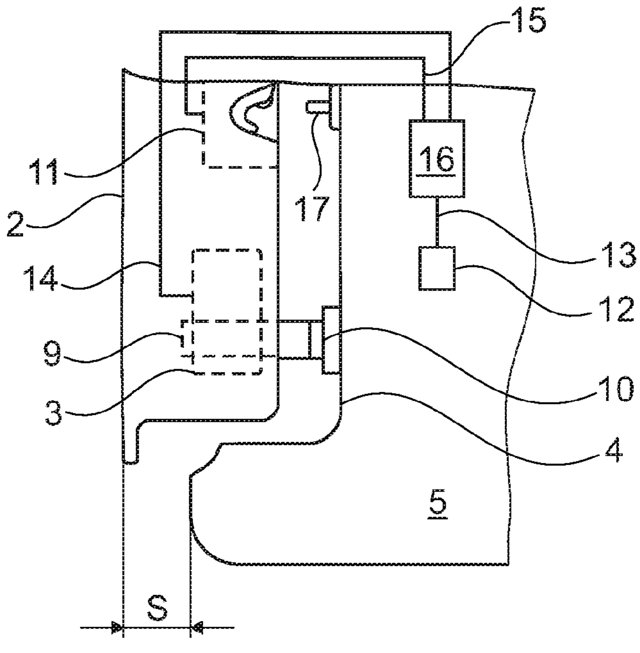
FIG. 2 shows a view of the opening device or the opening device integrated in the side door from the perspective of arrows II-II from FIG. 1.

FIG. 2 shows a view of the door element 2 from the perspective of arrows II-II in FIG. 1. The position of the opening device 3 as an integrated constituent of the door element 2 can be seen, an actuating means 9 being shown in a position moved out from the door element 2. The opening device 3 can have a locking means 10, but it is also conceivable that only one damper 10 is arranged at the axial end of the actuating element 9 so that holding the door element 2 and/or dampened opening of the door element 2 is possible. The door element 2 is shown in the open position according to FIG. 1.

The opening device 3, an electrically operated motor vehicle latch 11 and an inclination sensor 12 are connected to a control unit 16 via electrical lines 13, 14, 15. The electrical closing system or motor vehicle latch 11 interacts with a latch holder 17 so that known holding of the door element in the main ratchet position of the electrical latch 11 is possible.

If a control signal 7 is now transmitted to the control unit 16 by means of the radio remote control 8, the control unit 16 checks the position or inclination of the motor vehicle 5, the sensor data of the inclination sensor 12 being queried or evaluated. If the vehicle is in a position in which the incline exceeds an inclination limit value, an acoustic signal, for example, can be initialized by the control unit, as a result of which signals are sent to the operator of the motor vehicle that the incline prevents the door element 2 from being automatically opened. It is also conceivable, for example, that haptic feedback is given to the operator directly in the radio remote control 8 that indicates that the door element 2 should be opened manually for safety reasons. If it is determined by means of the inclination sensor 12 that the side door 2 can be opened, the control unit 16 forwards a first control signal to the electrical latch 11, the electrical latch being unlocked. In parallel to this or after the electrical latch 11 has been unlocked, the control unit 16 can activate the opening device 3 and move the door element 2 into the open position. The structure according to the invention and, in particular, the integration of the information from the inclination sensor in the motor vehicle 5 provide the possibility of increasing safety in the motor vehicle 1 and preventing damage to the door element 2 as well as obstruction to traffic through unwanted and unintentional movement of the door element 2 beyond the open position.

LIST OF REFERENCE SIGNS

- 1 motor vehicle
- 2 door element, side door
- 3 opening device
- 4 B-pillar
- 5 motor vehicle body
- 6 A-pillar
- 7 opening signal
- 8 radio remote control
- 9 actuating element
- 10 locking means, damper
- 11 electrically operated closing system
- 12 inclination sensor
- 13, 14, 15 electrical lines
- 16 control unit
- 17 latch holder
- S actuation path

The invention claimed is:

1. An opening device for a motor vehicle door element, the opening device comprising:

a control unit, an electric drive and an actuating element; and a lock for holding the door element in an open position, wherein the control unit is configured to control the electric drive to actuate the actuating element and the door element is opened by the actuating element, wherein the control unit is configured to control the electric drive on the basis of a position including an inclination angle of the motor vehicle compared to a limit angle, wherein the limit angle is a function of a holding force of the lock exerted on the door element in the open position, and wherein the control unit is configured to deactivate the opening device when the inclination angle of the motor vehicle exceeds the limit angle.

2. The opening device according to claim 1, further comprising an inclination sensor and sensor data of the inclination sensor indicating the inclination of the motor vehicle is evaluated by the control unit.

3. The opening device according to claim 1, wherein the control unit further is configured to deactivate the opening device on the basis of an angle of inclination including an adjustable angle of inclination of the motor vehicle.

4. The opening device according to claim 1, further comprising an acoustic, optical and/or haptic signal generator that generates a signal to an operator that the opening device has been opened or deactivated.

5. The opening device according to claim 1, wherein the control unit further is configured to detect an operator's signal to open the door element, and the control unit prevents opening the door element when a limit angle of the inclination of the motor vehicle is reached or exceeded.

6. The opening device according to claim 5, wherein the control unit further is configured to provide feedback to the operator when the control unit prevents opening the door element.

7. The opening device according to claim 1, wherein the control unit is further configured to unlock a motor vehicle latch assigned to the door element, and wherein the control unit is configured to unlock the motor vehicle latch on the basis of the position including the inclination of the motor vehicle compared to the holding force of the lock exerted on the door element in the open position.

8. A method for controlling an opening device of a motor vehicle door element comprising operating a control unit to actuate an electric drive, and the actuated electric drive actuates an actuating element for opening the door element, and receiving at least one sensor signal with the control unit for controlling the electric drive and evaluating the at least one the sensor signal with the control unit, wherein the at least one sensor signal is an angle of inclination of the motor vehicle provided by an inclination sensor of the motor vehicle, wherein evaluating the at least one sensor signal with the control unit includes comparing the at least one sensor signal to a limit angle, wherein the limit angle is a function of a holding force of a lock exerted on the door element when the lock holds the door element in an open position, and wherein the control unit is configured to deactivate the opening device when the inclination angle of the motor vehicle exceeds the limit angle.

9. The method for controlling an opening device according to claim 8, wherein a limit value of the angle of inclination is detected by the control unit, and wherein the opening device is deactivated when the angle of inclination limit value is reached or exceeded.

10. The method for controlling an opening device according to claim 9, wherein reaching or exceeding the angle of inclination limit value is indicated acoustically, optically and/or haptically.

11. The method for controlling an opening device according to claim 7, wherein the inclination sensor is integrated in the opening device.

12. The method for controlling an opening device according to claim 8, further comprising operating the control unit to unlock a motor vehicle latch assigned to the door element, wherein the control unit is configured to unlock the motor vehicle latch on the basis of the position including the inclination of the motor vehicle compared to the holding force of the lock exerted on the door element in the open position.

* * * * *